(12) United States Patent
Fischer et al.

(10) Patent No.: US 9,061,603 B2
(45) Date of Patent: Jun. 23, 2015

(54) OCCUPANT DETECTION SYSTEM AND METHOD

(75) Inventors: Thomas Fischer, Wenden (DE); Mike Albani, Leverkusen (DE)

(73) Assignee: Delphi Technologies, Inc., Troy, MI (US)

( * ) Notice: Subject to any disclaimer, the term of this patent is extended or adjusted under 35 U.S.C. 154(b) by 453 days.

(21) Appl. No.: 13/571,511

(22) Filed: Aug. 10, 2012

(65) Prior Publication Data
US 2014/0043047 A1 Feb. 13, 2014

(51) Int. Cl.
*G01R 27/28* (2006.01)
*B60N 2/00* (2006.01)
*B60R 21/015* (2006.01)

(52) U.S. Cl.
CPC .......... *B60N 2/002* (2013.01); *B60R 21/01532* (2014.10); *B60R 21/0154* (2014.10)

(58) Field of Classification Search
CPC ....................................................... G01R 27/28
USPC ........... 324/658–690; 345/173–178; 280/735; 701/45; 340/686.6
See application file for complete search history.

(56) References Cited

U.S. PATENT DOCUMENTS 7,181,324 B2 * 2/2007 Fischer et al. ................... 701/36
7,217,891 B2 * 5/2007 Fischer et al. ................. 177/144
7,449,648 B2 * 11/2008 Fischer et al. ............. 200/85 R
8,022,834 B2 * 9/2011 Fischer ......................... 340/667
8,091,960 B2 * 1/2012 Kincaid et al. ........... 297/180.12
8,154,394 B2 4/2012 Hansen
8,237,455 B2 8/2012 Griffin
8,335,617 B2 * 12/2012 Satake et al. ..................... 701/47
2008/0186282 A1 * 8/2008 Nix et al. ........................ 345/173
2009/0295199 A1 * 12/2009 Kincaid et al. ........... 297/180.12
2011/0121618 A1 * 5/2011 Fischer et al. ............ 297/180.12
2011/0148648 A1 * 6/2011 Fischer et al. ............. 340/686.6
2011/0190980 A1 8/2011 Kincaid
2011/0307148 A1 * 12/2011 Griffin et al. .................... 701/45
2012/0126888 A1 * 5/2012 Ikriannikov et al. ............. 330/69
2013/0015863 A1 * 1/2013 Lamesch et al. ............... 324/663
2013/0092677 A1 * 4/2013 Virnich et al. ................. 219/204

OTHER PUBLICATIONS

European Search Report dated Oct. 30, 2013.

* cited by examiner

*Primary Examiner* — Patrick Assouad
*Assistant Examiner* — Lamarr Brown
(74) *Attorney, Agent, or Firm* — Lawrence D. Hazelton

(57) ABSTRACT

An occupant detection system and method that uses an isolation assembly to isolate electrically a power supply providing power to a heater element for heating a vehicle seat from a sensing circuit that uses the heater element as an electrode for electric field or capacitance type occupant detection. The isolation assembly includes a common mode choke that by itself provides sufficient isolation when the sensing circuit excitation signal frequency is high enough, and provides switches that infrequently interrupt electrical power to the heater element so a humidity level can be determined using a relatively low excitation signal frequency. Knowing the humidity level is desirable to adjust a threshold use to determine if the sensing circuit indicates that the seat is empty, or is occupied.

4 Claims, 5 Drawing Sheets

OCCUPANT DETECTION SYSTEM AND METHOD

TECHNICAL FIELD OF INVENTION

This disclosure generally relates to capacitive type occupant detection systems, and more particularly relates to a way to determine high humidity and wet seat conditions without interfering with the operation of a seat heater element.

BACKGROUND OF INVENTION

Occupant detection systems that use a heater element for both seat heating and occupant detection are known. Some of these systems operate by periodically disconnecting the heater element from the power supply providing energy to heat the heater element so the occupant detection circuit can use the heater element as an occupant sensor electrode. An example of such a system is described in U.S. Pat. No. 8,091,960 issued to Kincaid et al. on Jan. 10, 2012. In order to detect if an occupant is present, and/or determine if the occupant is seated properly, it is desirable to repeat frequently the occupant detection, every ten milliseconds (10 ms), for example. However, such frequent interruptions undesirably reduce the maximum power that can be delivered to the heater element, and may undesirably generate electronic noise in the vehicle electrical system.

It has been proposed to replace the circuitry used to disconnect periodically the heater element from the power supply, as described above, with a common mode choke. An example of such a system is described in United States Patent Publication Number 2011/0121618 published by Fischer et al. on May 26, 2011. However, the desire to use a broad range of excitation signal frequencies, for example 5 kHz to 2 MHz, made providing a suitable common mode choke problematic. In particular, the desire to operate at relative low excitation signal frequencies (5 kHz to 200 kHz) in order to detect and compensate the occupant detection for high humidity and wet seat conditions necessitates an undesirably large and heavy common mode choke.

SUMMARY OF THE INVENTION

In accordance with one embodiment, a method of operating an occupant detection system is provided. The occupant detection system includes a heater element, an electrical network, excitation source, and an isolation assembly. The heater element is arranged proximate to a seating surface of an occupant. The heater element is electrically coupled to a power supply for providing electrical power to heat the heater element. The electrical network is coupled to the heater element to form a sensing circuit that includes the occupant as part of the sensing circuit. The excitation source is configured to output an excitation signal having an excitation frequency. The excitation source is coupled to the sensing circuit effective to generate a sensor signal indicative of an occupant presence proximate to the heater element. The isolation assembly is interposed between the heater element and the power supply to isolate electrically the heater element from the power supply. The isolation assembly includes a common mode choke formed of a first inductor coupled magnetically to a second inductor, a first switch connected in series with the first inductor, and a second switch connected in series with the second inductor. The method includes the step of operating both the first switch and the second switch to a closed state. The method also includes the step of operating the excitation source to output a first excitation signal at a first frequency while both the first switch and the second switch are at a closed state. The first frequency is selected high enough so the common mode choke is effective to isolate electrically the first excitation signal from the power supply when both the first switch and the second switch are in the closed state. The method also includes the step of determining a first sensor signal indicative of occupant presence, wherein the first sensor signal arises in response to the first excitation signal at the first frequency. The method also includes the step of operating both the first switch and the second switch to an open state. The method also includes the step of operating the excitation source to output a second excitation signal at a second frequency less than the first frequency while both the first switch and the second switch are at an open state. The second frequency is selected low enough so the sensor signal is indicative of a humidity level proximate to the heater element. The method also includes the step of determining a second sensor signal indicative of humidity. The second sensor signal arises in response to the second excitation signal at the second frequency.

In one embodiment, the step of determining the first sensor signal indicative of occupant presence is repeated periodically at a first time interval, and the step of determining the second sensor signal indicative of humidity is repeated periodically at a second time interval greater than the first time interval.

In another embodiment, an occupant detection system is provided. The system includes an electrical network, an excitation source, and isolation assembly. The electrical network is configured to be coupled to a heater element arranged proximate to a seating surface of an occupant to form a sensing circuit that includes the occupant as part of the sensing circuit. The heater element is electrically coupled to a power supply for providing electrical power to heat the heater element. The excitation source is configured to output an excitation signal having an excitation frequency. The excitation source is coupled to the sensing circuit effective to generate a sensor signal indicative of an occupant presence proximate to the heater element. The isolation assembly is interposed between the heater element and the power supply to isolate electrically the heater element from the power supply. The isolation assembly includes a common mode choke formed of a first inductor coupled magnetically to a second inductor, a first switch connected in series with the first inductor, and a second switch connected in series with the second inductor. The system is configured to operate the excitation source to output a first excitation signal at a first frequency while both the first switch and the second switch to a closed state. The first frequency is selected high enough so the isolation assembly is effective to isolate electrically the first excitation signal from the power supply when both the first switch and the second switch are in the closed state. The system is also configured to operate the excitation source to output a second excitation signal at a second frequency less than the first frequency while both the first switch and the second switch to an open state. The second frequency is selected low enough so the sensor signal is indicative of a humidity level proximate to the heater element.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
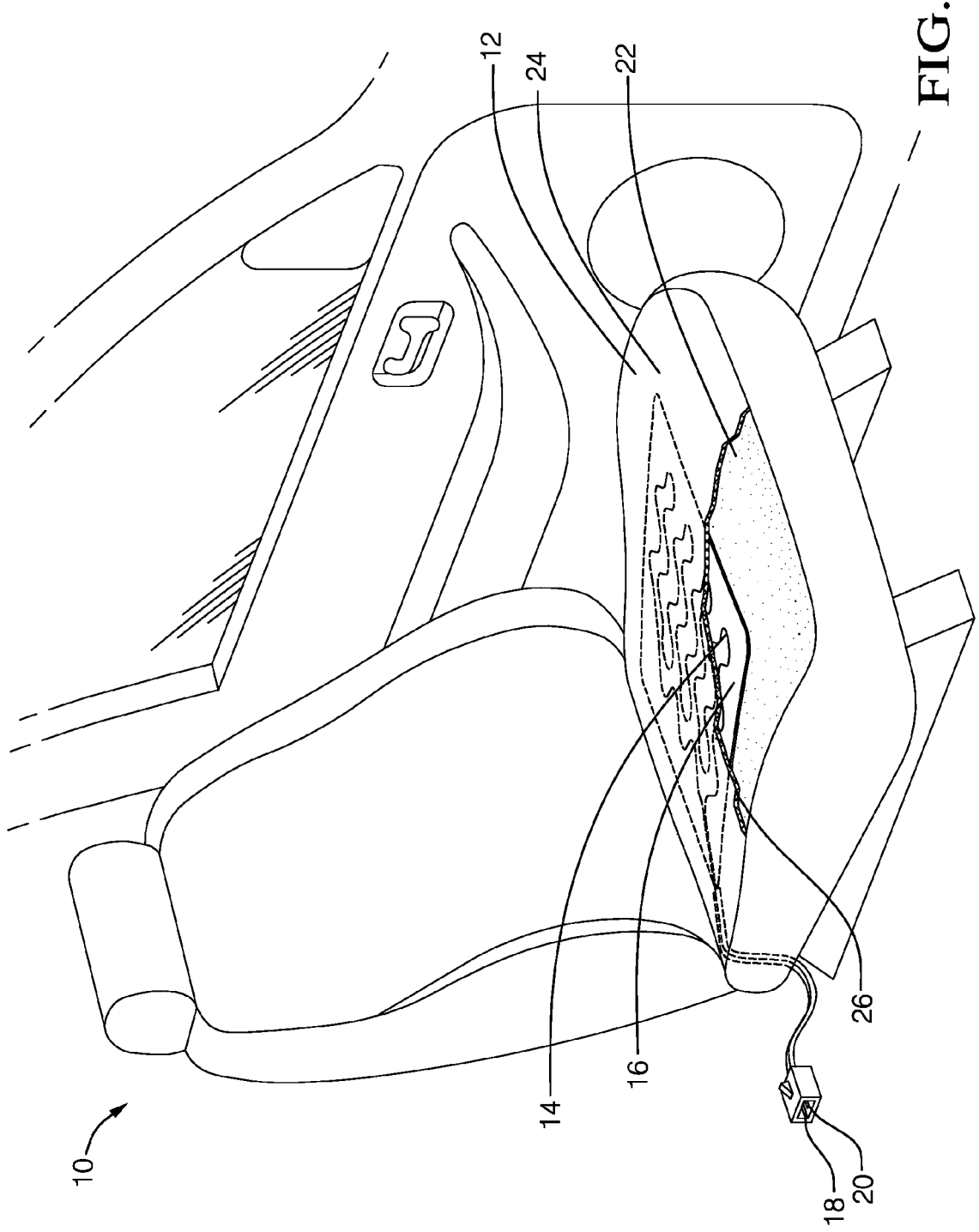
FIG. 1 is perspective view of a seat assembly equipped with at heater element and installed in vehicle in accordance with one embodiment.

FIG. 1 illustrates a non-limiting example of a seat assembly 10 installed in a vehicle passenger compartment. In general, the seat assembly 10 includes a seat cushion 12 that defines a seating surface 24 for supporting an occupant (not shown). Within the seat cushion 12 is a cushion 22 typically made of foam sized and shaped corresponding to seat cushion 12. Adjacent the seating surface 24 is mat 16 having the heater element 14 attached to the mat 16. The heater element 14 may be made of any electrically conductive material capable of surviving the stress and strain of being adjacent a seating surface, and providing sufficient electrical resistance to electrical current to generate a quantity of heat effective to warm the seating surface 24. Exemplary forms of heater elements include metal wire, conductive fiber, metal foil, and metal ribbon. The cushion 22 is typically covered with a covering 26 to protect the foam that forms the cushion 22, protect the heater element 14, and to make the appearance of the seat assembly 10 attractive. The mat 16 is preferably arranged between the cushion 22 and the covering 26, thereby making the seat assembly 10 simple to manufacture. Positioning the heater element 14 near the seating surface 24 promotes heat transmission from the heater element 14 through the covering 26 and to the seating surface 24, thereby improving occupant comfort when seat heating is desired. The positioning of the heater element 14 near the seating surface 24 also improves occupant detection sensitivity and accuracy by maximizing electrical field coupling to the occupant. The ends of heater element 14 may be terminated with a first terminal 18 and a second terminal 20, so are readily connected to the rest of the occupant detection/seat heating system.

Figure 2:
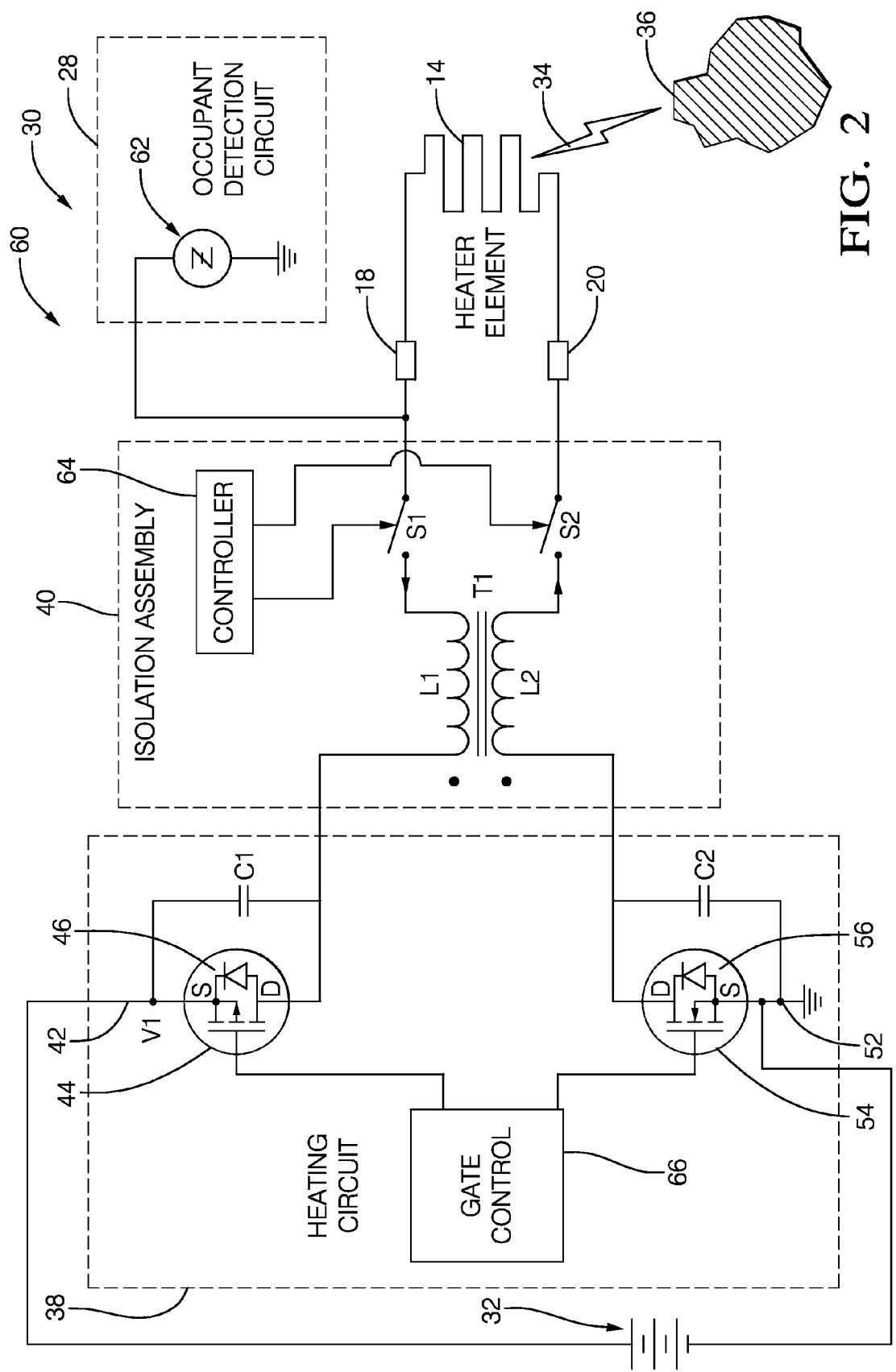
FIG. 2 is a diagram of an occupant detection system for use with the heater element of FIG. 1 in accordance with one embodiment.

FIG. 2 illustrates a non-limiting example of an occupant detection system, hereafter the system 30. The system 30 is generally coupled to the heater element 14 so the heater element can be used to generate an electric field 34 between the heater element 14 and an occupant illustrated in this example as an irregular shape 36. The system 30 may also include an electrical network 28 coupled to the heater element 14 to form a sensing circuit 60 that includes the occupant as part of the sensing circuit 60. In one embodiment, the electrical network 28 may include an impedance-determining means 62 to determine if the occupant is proximate to the heater element 14.

By way of example and not limitation, the impedance-determining means 62 may include an excitation source (not shown) configured to output an excitation signal having an excitation frequency, and a signal detection means (not shown) configured to determine a value of a sensor signal arising in response to the excitation signal. For example, the signal detection means may be a voltage measuring means such as an analog to digital convertor (ADC). The excitation source is generally coupled to the sensing circuit 60 in a manner effective to generate a sensor signal indicative of an occupant presence proximate to the heater element 14.

Further details regarding how to apply an excitation signal to the heater element 14 or other electrode in order to generate a sensor signal and detect an occupant are described in U.S. Pat. No. 8,091,960 issued to Kincaid et al. on Jan. 10, 2012; United States Patent Publication Number 2011/0307148 published by Griffin et al. on Dec. 15, 2011, 2011; and United States Patent Publication Number 2011/0121618 published by Fischer et al. on May 26, 2011, the entire contents of each are hereby incorporated by reference herein.

Figure 4:
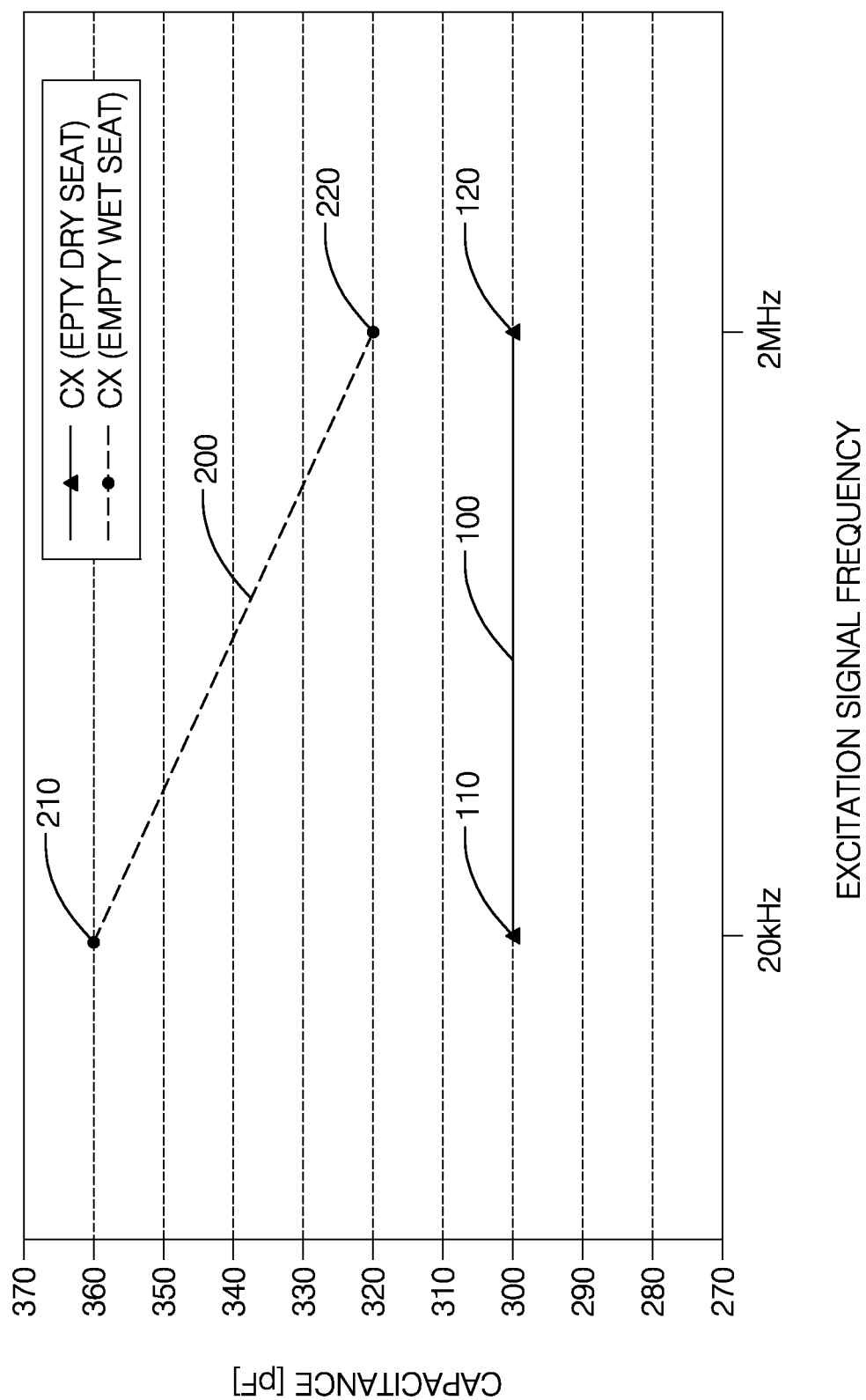
FIG. 4 is data from the occupant detection system of FIG. 1 in accordance with one embodiment.
Figure 5:
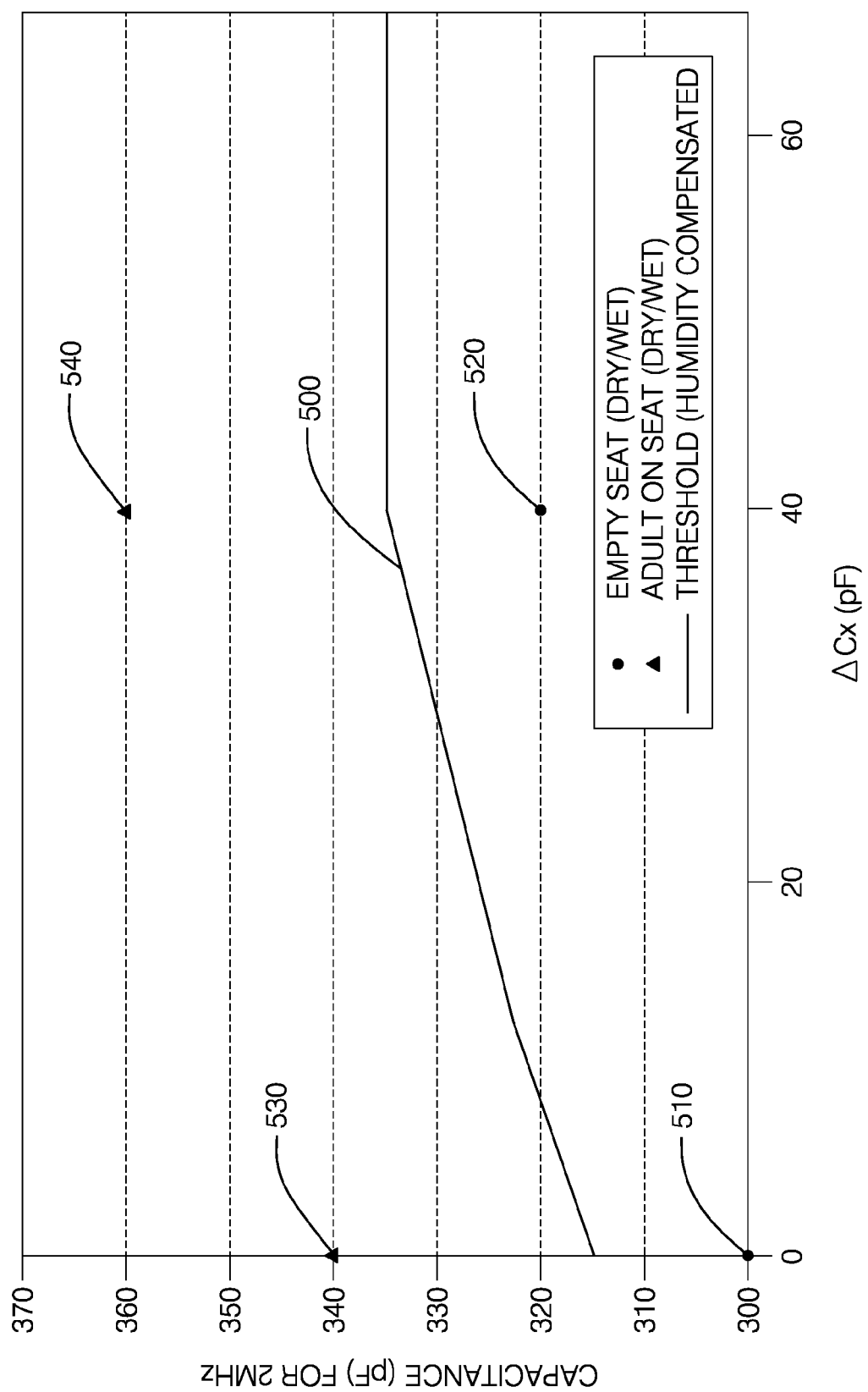
FIG. 5 is data from the occupant detection system of FIG. 1 in accordance with one embodiment.

Alternatively, the impedance determining means 62 may output an impedance value, for example a capacitance value, as a sensor signal. It should be recognized that a sensor signal corresponding to a magnitude of a signal present at the first terminal 18 will generally correspond with a capacitance value. FIGS. 4 and 5 illustrate the effect humidity level has on a capacitance value measured by a typical capacitance measuring device attached to a representative heater element installed in representative a seat assembly.

FIG. 4 illustrates a line 100 is defined by data point 110 indicating the measured capacitance of a dry seat with a 20 kHz excitation signal frequency, and data point 120 indicating the measured capacitance of a dry seat with a 20 kHz excitation signal frequency. Line 100 generally indicates that the capacitance measurement is not sensitive to the excitation signal frequency if the seat is dry, for example, when the relative humidity is less than twenty percent (20%) when the ambient temperature is about twenty degrees Celsius (20° C.). Similarly, line 200 is defined by data point 210 indicating the measured capacitance of a wet seat with a 20 kHz excitation signal frequency, and data point 220 indicating the measured capacitance of a wet seat with a 20 kHz excitation signal frequency. In contrast, line 200 generally indicates that the capacitance measurement is sensitive to the excitation signal frequency if the seat is wet, for example, when a bottle of water (e.g. 200 ml) is spilled onto the seat assembly 10 or when the vehicle's window or sun-roof is left open while it is raining, and the ambient temperature is about twenty degrees Celsius (20° C.). The data also indicates that the measured capacitance value increases as the moisture level increases, regardless of the excitation signal frequency.

FIG. 5 illustrates a non-limiting example of a threshold 500 useful to determine if the capacitance indicated when using a 2 MHz excitation signal is indicative of the seat assembly 10 being empty or occupied. A humidity level indicated by a difference in indicated capacitance reading when using a 20 kHz and 2 MHz excitation signal is used to determine the threshold. Data point 510 corresponds to line 100 on FIG. 4 where a dry-empty seat exhibits no change in the capacitance reading ($\Delta Cx=0$), and data point 520 corresponds to line 200 on FIG. 4 where a wet-empty seat exhibits a change of forty pico-Farads ($\Delta Cx=40$ pF). Data point 530 and data point 540 are also determined by way of empirical testing as examples of a dry seat occupied by a typical adult (data point 530), and a wet seat occupied by a typical adult (data point 540). Once the threshold is determined by locating a point on line 500 for humidity level compensation based on the difference in capacitance reading caused by using a 20 kHz and 2 MHz excitation signal ($\Delta C$), determining if the seat is occupied can be based solely on the capacitance indicated by the 2 MHz excitation signal. It is noted that if the humidity level was unknown and uncompensated for, data point 520 could mistakenly be determined to indicate that the seat was occupied.

In general, the heater element 14 is electrically coupled to a power supply 32 for providing electrical power to heat the heater element 14. The power supply 32 may be twelve volt (12V) electrical power available in most vehicles, and so is illustrated in this example with a typical battery symbol. The system 30 also generally includes an isolation assembly 40 interposed between the heater element 14 and the power supply 32 to isolate electrically the heater element 14 (i.e. the excitation signal applied to the heater element 14) from, for example, the power supply 32. As used herein, 'isolate electrically' means that the isolation assembly 40 provides sufficient electrical impedance to prevent a significant portion of the excitation signal energy applied to the heater element 14 from being dissipated other than into the electric field 34 emitted by the heater element 14. If a too much of the excitation signal is dissipated into the power supply, the sensor signal or occupant detection signal-to-noise ratio may become too low to reliably detect an occupant. In other words, the isolation assembly 40 isolates electrically the heater element 14 or the excitation signal so that the power supply 32 does not interfere with occupant detection by, for example, shunting the excitation signal to ground. It should be recognized that the 'isolate electrically' is not to be interpreted as 'insulate electrically', although 'insulate electrically' is not excluded from 'isolate electrically'.

Referring again to FIG. 2, the system 30 may include a switch assembly 38 that includes a power switch 44, 54 operable to connect and disconnect the power supply 32 to and from the isolation assembly 40. The power switch 44 may be a high-side configured metal-oxide-semiconductor-field-effect-transistor (high-side MOSFET 46) able to connect or disconnect the isolation assembly 40 to and from a positive potential 42 of the power supply 32. Similarly, the power switch 54 may be a low-side MOSFET 56 able to connect or disconnect the isolation assembly 40 to and from a negative potential 52 of the power supply 32. Alternatively, the power switch 44, 54 may be other types of transistors such as bipolar transistor. As the stitch assembly 38 may be used to pulse width modulate electrical power to the heater element 14, it is not preferable to use an electromechanical relay for the power switch 44, 54 as the number of cycles reliability and maximum cycling speed may not be adequate for an automotive environment.

When the power switch 44, 54 is a MOSFET, the MOSFET may exhibit a parasitic capacitance from the drain D to the source S of the MOSFET that is variable with temperature and applied voltage. Such a variable capacitance may cause undesirable variability in the apparent electrical impedance of the heater element 14, and so degrade the accuracy of the system 30. As such, the switch assembly 38 may also include a bypass capacitor C1, C2 connected in parallel with the power switch 44, 54. The capacitor C1, C2 is generally selected to have a capacitance value much larger than the expected parasitic capacitance of the power switch 44, 54, for example more than one hundred times greater. The capacitor C1, C2 is preferably formed of a dielectric material that has stable electrical characteristic over temperature, time, and applied voltage.

Continuing to refer to FIG. 2, the isolation assembly 40 includes a common mode choke T1 formed of a first inductor L1 coupled magnetically to a second inductor L2. Connecting the common mode choke T1 to the system 30 with the polarity shown helps to minimize the amount of excitation signal that is dissipated by the power supply, and or the bypass capacitor C1, C2. If the frequency of the excitation signal frequency is sufficiently high, greater than 500 kHz for example, a commercially available common mode choke may provide for sufficient electrical isolation for the system 30 to determine the presence of an occupant. However, at lower frequencies, less than 200 kHz for example, suitably sized common mode chokes may not be readily available.

Applicants recognized that determining a humidity level for correcting or compensating the detection or determining of an occupant did not need to be repeated as often as determining occupant presence. For example, it is considered sufficient to determine a humidity level every six hundred seconds (600 seconds or 10 minutes) while the detection of an occupant is preferably performed more often, every ten milliseconds (10 ms) for example. Since a suitable common mode choke may not be available to isolate electrically a low frequency excitation signal for determining a humidity level, the isolation assembly 40 may include a first switch S1 connected in series with the first inductor L1, and a second switch S2 connected in series with the second inductor L2. By opening these switches, the isolation assembly now adds the open circuit parasitic impedance of the switches to the isolation impedance of the common mode choke T1. Because of the low cycling rate of the first switch S1 and the second switch S2, both switches may be electromechanical relays. Electromechanical relays are advantageous because they have an open circuit impedance (i.e. parasitic capacitance) significantly lower than solid state device such as MOSFETs, a few pico-Farads for a suitable relay versus a few hundred pico-Farads for a suitable MOSFET.

As such, the system 30 advantageously operates the isolation assembly 40 so that occupant detection can be performed periodically at a relatively short time interval, every ten milliseconds (10 ms) for example, and a humidity level for compensating the occupant detection can be performed periodically as a relatively long time interval, every ten minutes (10 minutes) for example. A high frequency excitation signal (a first excitation signal) is sufficient to determine occupant presence if the humidity level is already known. With the short repetition interval for occupant detection, any changes in seat occupancy caused by, for example, the occupant suddenly getting into or out of the vehicle, or the occupant climbs between the front seat and the back seat in the vehicle, or the occupant moves to a position where air-bag deployment is not preferable, are quickly detected, but without the undesirable frequent interruption of heating power to the heater element as described above if the common mode choke T1 was not present. It was recognized that changes in humidity are relatively slow, and so the operation of the first switches S1 and the second switch S2 to disconnect the heater element 14 from the power supply 32 can be done infrequently.

The isolation assembly 40 may also include a controller 64 configured to operate the first switch S1 and the second switch S2. The controller 64 may include a processor such as a microprocessor or other control circuitry as should be evident to those in the art. The controller 64 may include memory, including non-volatile memory, such as electrically erasable programmable read-only memory (EEPROM) for storing one or more routines, thresholds and captured data. The one or more routines may be executed by the processor to perform steps for determining if signals received by the controller 64 for determining an occupant presence as described herein. The controller 64 may also be equipped with timers, for example a counter in the processor, for determining the time intervals between instances of determining an occupant presence, and determining a humidity level.

The occupant detection circuit or electrical network 28, the switch assembly 38, and the isolation assembly 40 are illustrated as separate sections of the system 30. However, this is only for the purpose of explanation, and it is recognized that these sections may be integrated into a single circuit board assembly and enclosed within a common housing. Further-more, it is recognized that the controller 64 may provide control signals (not shown) to a gate control 66 in the switch assembly 38 and to the impedance-determining means 62 in the electrical network 28.

Figure 3:
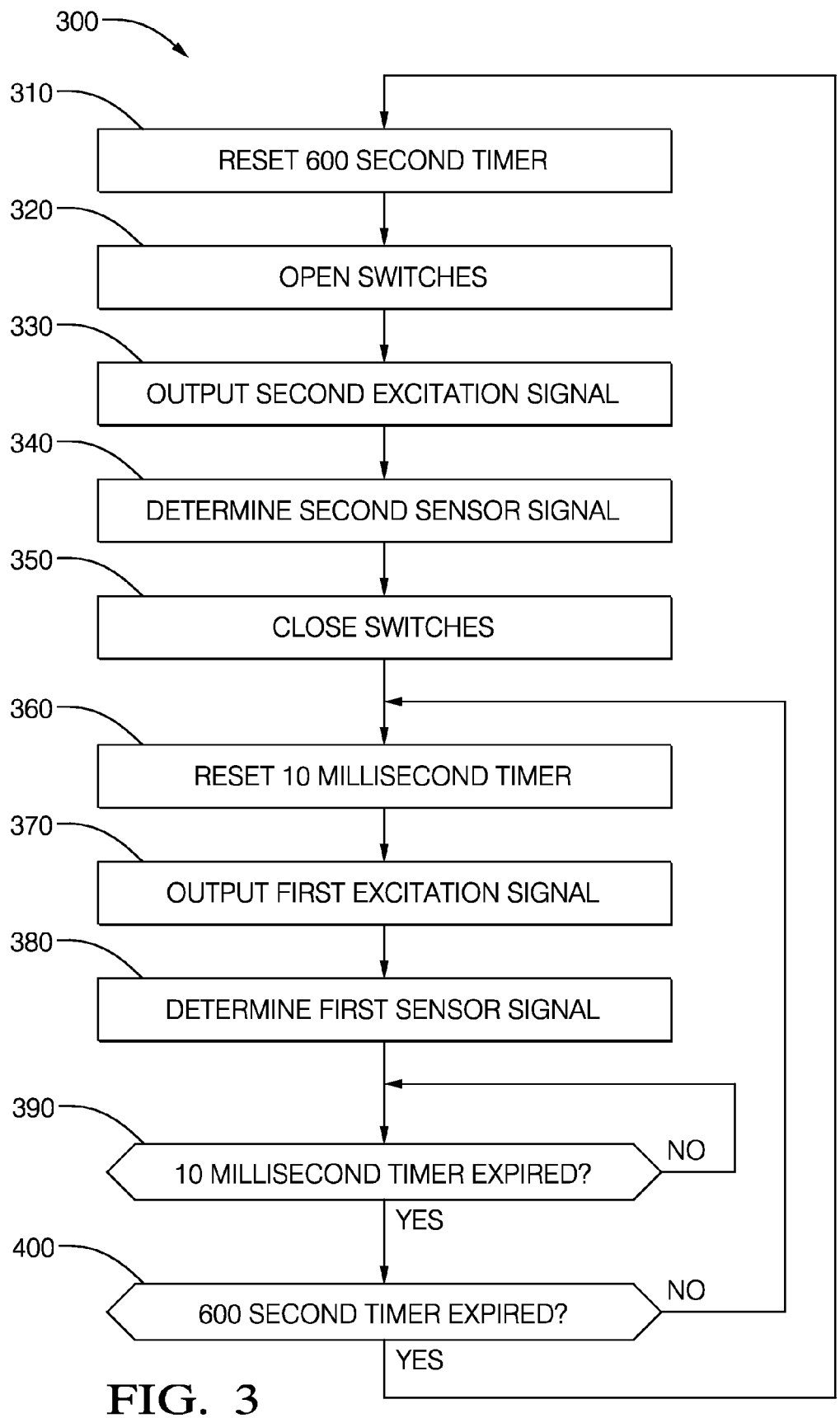
FIG. 3 is a flowchart of a method of operating the occupant detection system of FIG. 1 in accordance with one embodiment.

FIG. 3 illustrates a non-limiting example of method 300 of operating the system 30. The steps that follow may be executed by the controller 64.

Step 310, RESET 600 SECOND TIMER, may include a processor or similar device within the controller 64 operating to start or reset a timer (not shown) configured to determine when six hundred seconds have elapsed.

Step 320, OPEN SWITCHES, may include operating both the first switch S1 and the second switch S2 to an open state. The controller 64 may be configured to output control signals to the first switch S1 and the second switch S2 as illustrated in FIG. 2.

Step 330, OUTPUT SECOND EXCITATION SIGNAL, may include the controller 64 operating an excitation source within the impedance-determining means 62 to output a second excitation signal at a second frequency less than the first frequency (see Step 370), while both the first switch S1 and the second switch S2 are at an open state. As used herein, terms that include the modifiers 'first' or 'second' are used only to distinguish the terms, and are not to be construed as requiring that one to occur before or after the other. For example, it is recognized that the order of the steps presented in FIG. 3 can be rearranged in many ways, and still achieve the desired result of determining a humidity compensated indication of an occupant presence. In general, the second frequency is selected low enough so the sensor signal is indicative of a humidity level proximate to the heater element.

Step 340, DETERMINE SECOND SENSOR SIGNAL, may include the controller receiving or detecting a sensor signal present at the first terminal 18 while the second excitation signal is being emitted by the excitation signal source, and determining a second sensor signal indicative of humidity. It is noted that the second sensor signal arises in response to the second excitation signal at the second frequency.

Step 350, CLOSE SWITCHES, may include the controller 64 operating both the first switch S1 and the second switch S2 to a closed state. The controller 64 may be configured to output control signals to the first switch S1 and the second switch S2 as illustrated in FIG. 2.

Step 360, RESET 10 MILLISECOND TIMER, may include setting or resetting a counter within the controller to a predetermined value so the counter can be incremented or decremented to measure a time interval of ten milliseconds. Various ways to measure time intervals are known in the art. It should be recognized that the example time interval of ten milliseconds for determining repeatedly the presence of an occupant is a non-limiting example, and other shorter or longer time intervals may be suitable for determining occupant presence.

Step 370, OUTPUT FIRST EXCITATION SIGNAL, may include the controller 64 operating the excitation source to output a first excitation signal at a first frequency while both the first switch S1 and the second switch S2 are closed. In general, the first frequency is selected high enough so the common mode choke T1 is effective to isolate electrically the first excitation signal from the power supply 32 when both the first switch S1 and the second switch S2 are in the closed state.

Step 380, DETERMINE FIRST SENSOR SIGNAL, may include the controller 64 determining a first sensor signal indicative of occupant presence. It is noted that the first sensor signal arises in response to the first excitation signal at the first frequency.

Step 390, 10 MILLISECOND TIMER EXPIRED?, may include the controller 64 waiting for a timer to indicate that ten milliseconds has passed since the timer was reset. If the timer has not expired, i.e. the decision is NO, the method 300 may loop back to repeat this step unit the timer has expired. If the decision is YES, the method 300 proceeds to step 400.

Step 400, 600 SECOND TIMER EXPIRED? may include the controller 64 operating a second timer to determine when six hundred seconds has passed. If it is not yet time to determine a humidity level by executing steps 320, 330, and 340, the method may determine the presence of an occupant by repeating steps 360, 370, and 380.

Accordingly, an occupant detection system (the system 30), and a method 300 of operating the system 30 is provided. The system 30 advantageously combines a common mode choke T1 and switches S1, S2 (e.g. electromechanical relays) to provide for an isolation assembly that does not interfere with heating a heater element in a seat assembly, but does allow for compensating an occupant detection threshold for humidity. The common mode choke alone is inadequate to provide for determining a humidity level, and the relays alone are inadequate to provide for determining quickly occupant status or occupant presence changes, for example seat empty versus seat occupied by an adult versus seat occupied by a child.

While this invention has been described in terms of the preferred embodiments thereof, it is not intended to be so limited, but rather only to the extent set forth in the claims that follow.

We claim:

1. A method of operating an occupant detection system, said system comprising a heater element arranged proximate to a seating surface of an occupant, said heater element electrically coupled to a power supply for providing electrical power to heat the heater element, an electrical network coupled to the heater element to form a sensing circuit that detects that the occupant is present when the occupant is proximate to the sensing circuit, an excitation source configured to output an excitation signal having an excitation frequency, said excitation source coupled to the sensing circuit effective to generate a sensor signal indicative of an occupant presence proximate to the heater element, and an isolation assembly interposed between the heater element and the power supply to isolate electrically the heater element from the power supply, wherein said isolation assembly includes a common mode choke formed of a first inductor coupled magnetically to a second inductor, a first switch connected in series with the first inductor, and a second switch connected in series with the second inductor, said method comprising steps of:

operating both the first switch and the second switch to a closed state;

operating the excitation source to output a first excitation signal at a first frequency while both the first switch and the second switch are at a closed state, wherein the first frequency is selected high enough so the common mode choke is effective to isolate electrically the first excitation signal from the power supply when both the first switch and the second switch are in the closed state;

determining a first sensor signal indicative of occupant presence, wherein the first sensor signal arises in response to the first excitation signal at the first frequency;

operating both the first switch and the second switch to an open state;

operating the excitation source to output a second excitation signal at a second frequency less than the first frequency while both the first switch and the second switch are at an open state, wherein the second frequency is selected low enough so the sensor signal is indicative of a humidity level proximate to the heater element;

determining a second sensor signal indicative of humidity, wherein the second sensor signal arises in response to the second excitation signal at the second frequency; and compensating the detection of occupant presence for humidity based on a comparison of the first sensor signal and the second sensor signal, wherein the step of determining the first sensor signal indicative of occupant presence is repeated periodically at a first time interval, and the step of determining the second sensor signal indicative of humidity is repeated periodically at a second time interval greater than the first time interval.

2. The method in accordance with claim 1, wherein the first time interval is ten milliseconds (10 ms) and the second time interval is six hundred seconds (600 sec.).

3. An occupant detection system comprising:

an electrical network configured to be coupled to a heater element arranged proximate to a seating surface of an occupant to form a sensing circuit that detects that the occupant is present when the occupant is proximate to the sensing circuit, said heater element electrically coupled to a power supply for providing electrical power to heat the heater element;

an excitation source configured to output an excitation signal having an excitation frequency, said excitation source coupled to the sensing circuit effective to generate a sensor signal indicative of an occupant presence proximate to the heater element; and an isolation assembly interposed between the heater element and the power supply to isolate electrically the heater element from the power supply, wherein said isolation assembly includes a common mode choke formed of a first inductor coupled magnetically to a second inductor, a first switch connected in series with the first inductor, and a second switch connected in series with the second inductor, wherein the system is configured to operate the excitation source to output a first excitation signal at a first frequency while both the first switch and the second switch to a closed state to generate a first sensor signal indicative of occupant presence, wherein the first frequency is selected high enough so the isolation assembly is effective to isolate electrically the first excitation signal from the power supply when both the first switch and the second switch are in the closed state, and operate the excitation source to output a second excitation signal at a second frequency less than the first frequency while both the first switch and the second switch to an open state to generate a second sensor signal indicative of humidity, wherein the second frequency is selected low enough so the sensor signal is indicative of a humidity level proximate to the heater element; and compensate the indication of occupant presence for humidity based on a comparison of the first sensor signal and the second sensor signal, wherein the system is further configured to determine periodically the first sensor signal indicative of occupant presence at a first time interval, and determine periodically the second sensor signal indicative of humidity a second time interval greater than the first time interval.

4. The system in accordance with claim 3, wherein the system further comprises a switch assembly that includes a power switch operable to connect and disconnect the power supply to the isolation assembly, and a bypass capacitor connected in parallel with the power switch.

* * * * *